(12) United States Patent
Neiser

(10) Patent No.: US 6,743,100 B1
(45) Date of Patent: Jun. 1, 2004

(54) GAME CONTROLLER

(76) Inventor: Gabe Neiser, 2106 Nicole Dr., Port Jefferson Station, NY (US) 11746

( * ) Notice: Subject to any disclaimer, the term of this patent is extended or adjusted under 35 U.S.C. 154(b) by 114 days.

(21) Appl. No.: 09/969,915

(22) Filed: Oct. 3, 2001

(51) Int. Cl.7 .............................................. A63F 13/06
(52) U.S. Cl. ..................................... 463/37; 273/148 B
(58) Field of Search .............................. 463/36, 37, 38, 463/39; 273/148 B; 345/161

(56) References Cited

U.S. PATENT DOCUMENTS

| | | | | |
|---|---|---|---|---|
| 4,491,325 A | * | 1/1985 | Bersheim | 463/38 |
| 4,552,360 A | * | 11/1985 | Bromley et al. | 463/38 |
| 5,375,831 A | * | 12/1994 | Hsien-Chung | 273/148 B |
| 5,624,117 A | * | 4/1997 | Ohkubo et al. | 273/148 B |
| 5,785,317 A | * | 7/1998 | Sasaki | 273/148 B |
| 5,786,807 A | * | 7/1998 | Couch et al. | 345/161 |
| 5,919,092 A | * | 7/1999 | Yokoi et al. | 463/37 |
| 5,984,785 A | * | 11/1999 | Takeda et al. | 463/38 |
| 6,010,406 A | * | 1/2000 | Kajikawa et al. | 463/37 |
| 6,068,554 A | * | 5/2000 | Tyler | 463/38 |
| 6,231,444 B1 | * | 5/2001 | Goto et al. | 463/37 |
| 6,325,719 B1 | * | 12/2001 | Fukawa et al. | 463/37 |
| 6,614,420 B1 | * | 9/2003 | Han et al. | 345/161 |
| 2002/0128064 A1 | * | 9/2002 | Sobota | 463/37 |

FOREIGN PATENT DOCUMENTS

| | | | |
|---|---|---|---|
| JP | 406054962a | * | 3/1994 |
| JP | 406190145a | * | 7/1994 |

* cited by examiner

Primary Examiner—Michael O'Neill
(74) Attorney, Agent, or Firm—Keusey, Tutunjian & Bitetto, P.C.

(57) ABSTRACT

A game controller having user pivotal grips for adjusting the size, and thereby the ergonomics of the game controller to accommodate the size of a specific user's hands. The grips are connected to the body of the game controller at a pivot point, and an indexing or positioning system retains the position of the grips once adjusted to the specific user's hands.

17 Claims, 2 Drawing Sheets

GAME CONTROLLER

BACKGROUND OF THE INVENTION

1. Field of the Invention

The present invention relates to game controllers, and more particularly, to game controller ergonomics.

2. Description of the Prior Art

Game controllers for both console and computer gaming systems come in many different shapes and sizes. These shapes and sizes are designs by the respective manufacturers to accommodate button placement and the grip and controller layout when the controller is in the user's hands during operation. All these aspects of button placement and layout contribute in one way or another to the overall ergonomics of the game controller.

According to the Webster's® dictionary, "ergonomics" is defined as an applied science concerned with designing and arranging things people use so that the people and things interact most efficiently and safely. Thus, for game controllers, the ergonomics clearly relate to how the controller sits in the user's hands, and how the user can effectively and efficiently use the buttons and controls without undue strain on their hands.

U.S. Pat. Nos. 5,551,693, 5,759,100 and 6,001,015 show various different designs for game controllers. In each instance, the game controllers have grips or handles that user grasps while activating buttons or other controls on the body of the game controller. In the more recent designs, the grips/handles are more ergonomically designed to include curved surfaces in an effort to accommodate the user's hands in a comfortable, yet effective manner.

SUMMARY OF THE INVENTION

It is therefore an object of the invention to provide a game controller having adjustably positioned grip/handles for accommodating different user hand sizes in a more ergonomic manner.

It is yet another object of the invention to provide a game controller having adjustably positionable grip/handles to allow for user specific ergonomic adjustment.

These and other objects are achieved in accordance with an embodiment of the invention wherein the game controller includes a body having a plurality of controls for controlling gaming action, and hand grips pivotally connected to the body for providing variable operating positions for the hand grips with respect to the controller body and thereby the control buttons.

A positioning system allows the hand grips to be adjusted into and retained in the desired operating position for the specific user. The positioning system can include a detent on the hand grip and a plurality of corresponding indents on the body for receiving the detent, or vice versa. In another embodiment a resilient friction fit between the hand grip and the body is made to provide an infinite number of positions for the hand grips to accommodate users of any size hands.

An indexing system provides a visual indication of the hand grip position with respect to the game controller body and thereby allows the user to remember their preferred hand grip position when coming back to the game controller after another user has adjusted the same for their use.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numeral denote similar components throughout the views.

DETAILED DESCRIPTION OF PREFERRED EMBODIMENTS

Figure 1A:
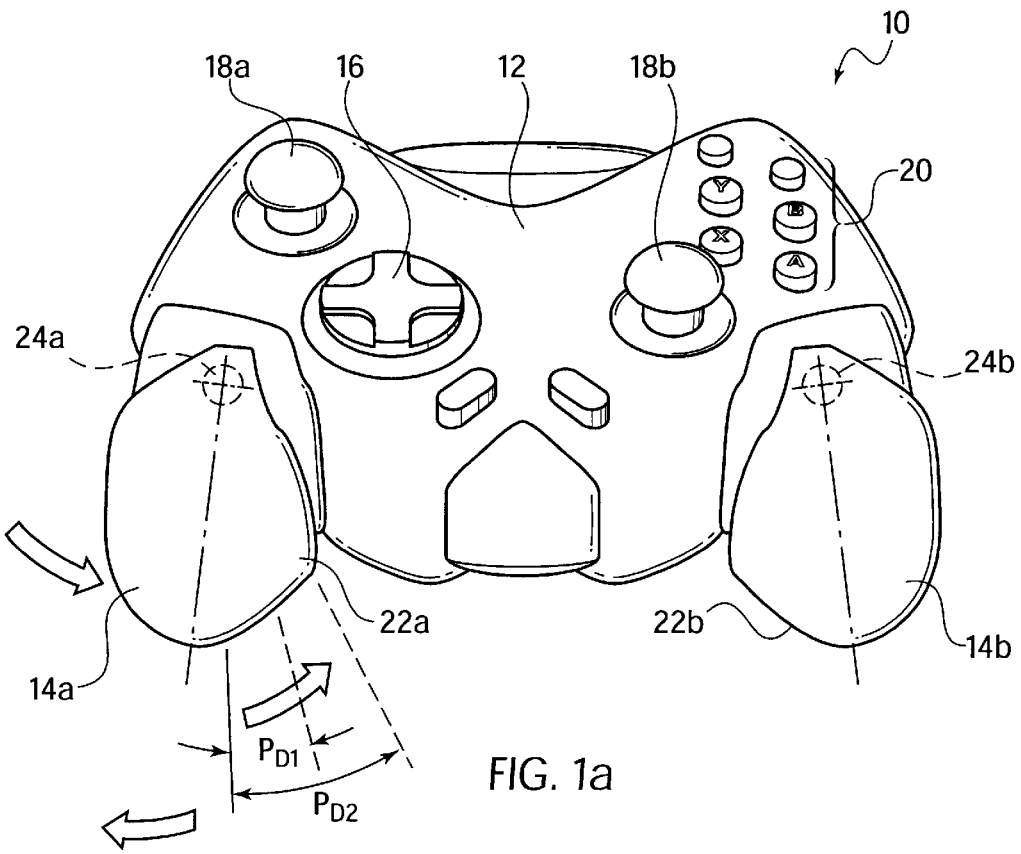
FIG. 1a is a perspective view of the game controller according to an embodiment of the invention.
Figure 2:
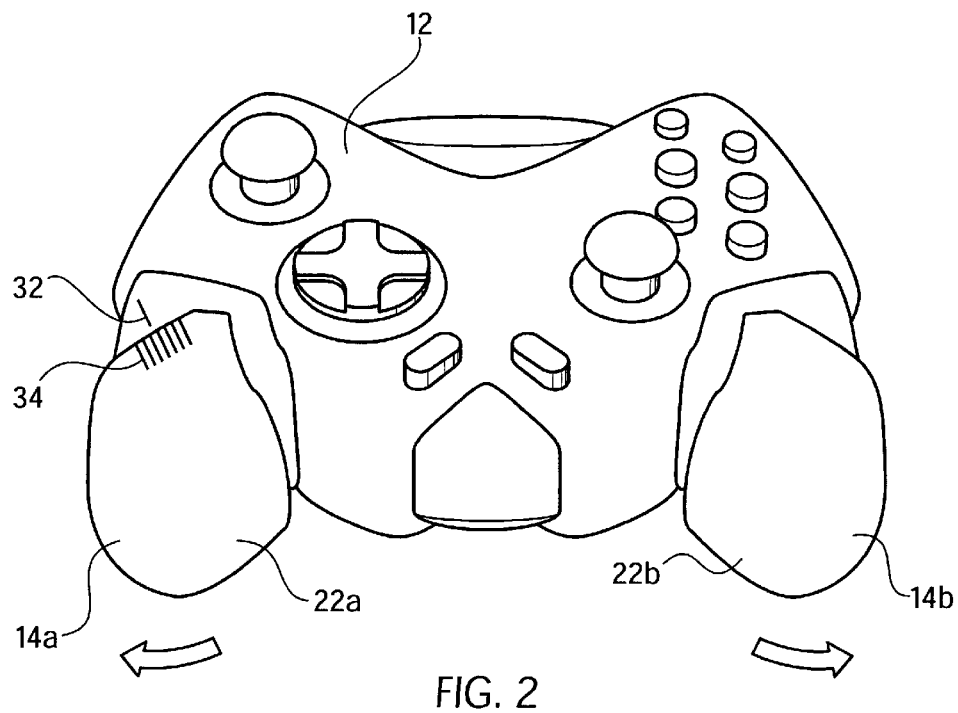
FIG. 2 is a perspective view of the game controller having its grips in a first operable position according to an embodiment of the invention.
Figure 3:
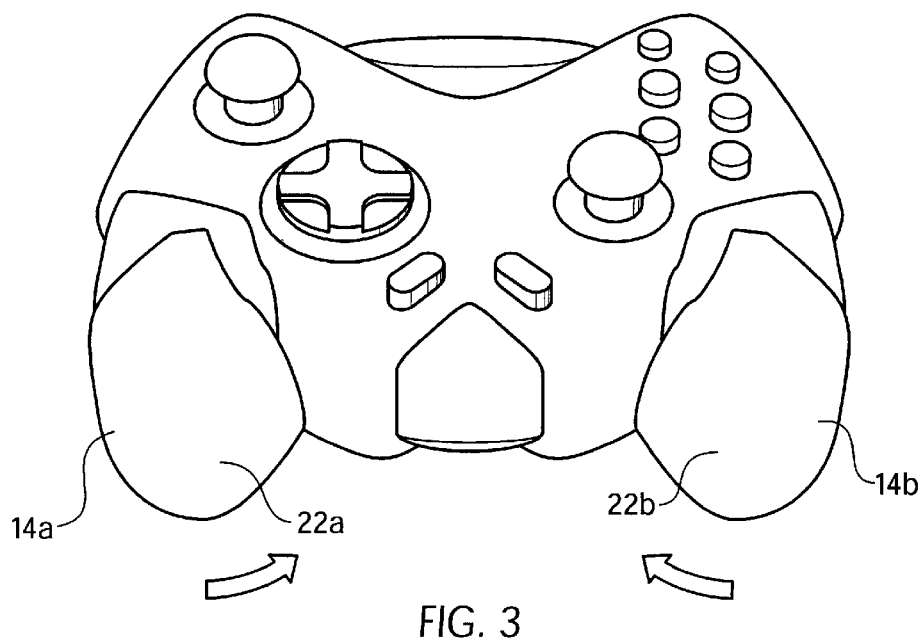
FIG. 3 is a perspective view of the game controller having its grips in a second operable position according to an embodiment of the invention.

Referring to FIGS. 1a, 2 and 3, there is shown the game controller 10 according to the present invention. The game controller 10 includes a body portion 12, left and right hand grips 14a and 14b, respectively, and a plurality of user controls 16, 18 and 20.

In accordance with an embodiment of the invention, hand grips 14a and 14b include an outer shell portion 22a and 22b, respectively. The outer shell portions 22a and 22b are substantially shaped to fit in the user's hands and include a pivot point 24a and 24b, respectively.

The outer shell portions are 22a and 22b are pivotal about points 24a and 24b and thereby allow the respective hand grips 14a and 14b to be adjustable within a predetermined range of motion. This adjustable motion of shell portions 22a and 22b, and therefore grips 14a and 14b allows the user to adjust the size of the controller to obtain the most ergonomically correct position for the specific user.

Figure 1B:
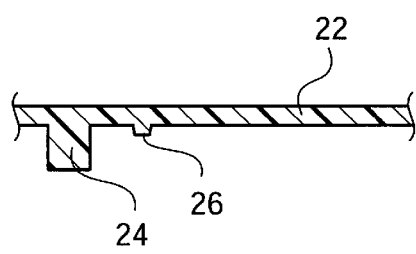
FIG. 1b is a partial cross-section of the grip outer shell according to an embodiment of the invention.

Outer shells 22a and 22b are adjustable and can include specific indexed positions, or alternatively, an infinite number of positions. For example, as shown, outer shell 22a can be moved inwardly a predetermined distance $P_{D1}$, $P_{D2}$, etc. depending on the desired position. In accordance with this embodiment, a clicking or other type of positioning system can be provided. For example, referring to FIG. 1b, the outer shell 22 can include a detent 26 on the underside thereof that is aligned with and adapted to be received by one of a plurality of indents (not shown) in the body 12 of game controller 10. In this manner, several "snap" like positions can be provided for adjusting outer shells 22a and 22b, and therefore the ergonomics of game controller 10 depending on the particular user. Alternatively, the detent 26 can be on the body of the controller, and the indents can be on the underside of the outer shell 22. Those of ordinary skill in the art will recognize that the position of detent 26 and corresponding indents (not show) can be changed without departing from the spirit of the invention.

Figure 1C:
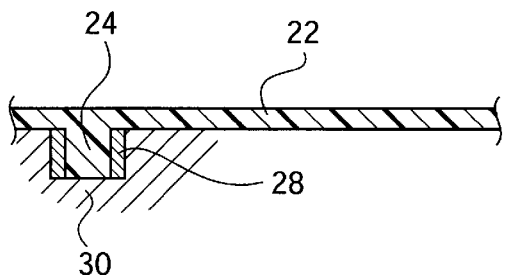
FIG. 1c is a partial cross-section of the grip outer shell according to another embodiment of the invention.

FIG. 1c shows another exemplary embodiment wherein the pivot point 24 is rotatably fitted within the inside 30 of the game controller body 12 in a resilient friction fit arrangement. In this configuration, the outer shell 22 can be infinitely positioned to accommodate the user's hand size. According to one embodiment, a resilient ring 28 or other bushing type member may be included to provide sufficient resistance to rotation and position holding capability of the pivot connection 24 between the outer shell 22 and the body of the game controller.

The position adjustment of the grips 14a and 14b of the present invention allows the user to adjust their hand position with respect to the controls 16, 18 and 20 and thereby adjust the ergonomics of the game controller for the most comfortable and efficient use of the same.

FIG. 2 shows an embodiment of an indexing system according to the present invention. The indexing system can include a plurality of hand grip indicator lines 34 and a body indicator line 32. Thus, when outer shell 22a is pivoted about pivot connection 24a, the hand grip indicator lines 34 will align with the body indicator line 32 and provide the user with a visual indication of the hand grip position with respect to the body. This indicating system, in conjunction with the positioning system will allow the user to easily reproduce their preferred hand grip position for this game controller.

In accordance with another embodiment of the invention, grips 14a and 14b can be configured in different shapes and sizes depending on the controller and the particular genre of game for which the controller is intended. Those of skill in the art understand that the actual shape and design of the game controller and corresponding grips is a matter of design choice and may be changed without departing from the spirit of the present invention.

While there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed, described or suggested form or embodiment as a general matter of design choice. It is the intention, therefore, to be limited only as indicated by the scope of the claims appended hereto.

What is claimed is:

1. A game controller comprising:
a body having a plurality of gaming controls;
at least one hand grip pivotally connected to said body and having at least two operable positions with respect to the gaming controls to allow for user-specific ergonomic adjustment; and
a positioning system for retaining said at least one hand grip in different positions with respect to said body.

2. The game controller according to claim 1, wherein said at least one pivotal hand grip comprises an outer shell portion pivotally connected to said body.

3. The game controller according to claim 1, wherein said positioning system comprises a detent on said hand grip and a plurality of indents on said body and being aligned to receive said detent in one of a said at least two positions when said hand grip is pivotally moved about said pivotal connection.

4. The game controller according to claim 1, wherein said positioning system comprises a resilient friction fit between said hand grip and said body, said resilient friction fit being sufficient to allow movement of said at least one hand grip and retain said hand grip in a desired position.

5. The game controller according to claim 1, further comprising an indexing system for indicating the position of said at least one hand grip with respect to said body.

6. The game controller according to claim 5, wherein said indexing system comprises a plurality of hand grip indicator lines on said hand grip and at least one body indicator line on said body, wherein said at least one body indicator line is aligned with at least one of said plurality of hand grip indicator lines when said at least one hand grip is positioned in a desired operable position by the user.

7. A game controller comprising:
a body having a plurality of gaming controls;
at least one hand grip pivotally connected to said body and having at least two operable positions with respect to the gaming controls for accommodating more than one hand size during use of the game controller;
an indexing system for indicating the position of said at least one hand grip with respect to said body; and
a positioning system for retaining said at least one hand grip in different positions with respect to said body.

8. The game controller according to claim 7, wherein said at least one pivotal hand grip comprises an outer shell portion pivotally connected to said body.

9. The game controller according to claim 7, wherein said positioning system comprises a detent on said hand grip and a plurality of indents on said body and being aligned to receive said detent in one of a said at least two positions when said hand grip is pivotally moved about said pivotal connection.

10. The game controller according to claim 7, wherein said positioning system comprises a resilient friction fit between said hand grip and said body, said resilient friction fit being sufficient to allow movement of said at least one hand grip and retain said hand grip in a desired position.

11. The game controller according to claim 7, wherein said indexing system comprises a plurality of hand grip indicator lines on said hand grip and at least one body indicator line on said body, wherein said at least one body indicator line is aligned with at least one of said plurality of hand grip indicator lines when said at least one hand grip is positioned in a desired operable position by the user.

12. A game controller comprising:
a body having a plurality of gaming controls;
at least one hand grip pivotally connected to said body and having at least two different operable positions with respect to the gaming controls for accommodating more than one hand size during use of the game controller; and
a positioning system for retaining said at least one hand grip in different positions with respect to said body.

13. The game controller according to claim 12, wherein said at least one pivotal hand grip comprises an outer shell portion pivotally connected to said body.

14. The game controller according to claim 12, wherein said positioning system comprises a detent on said hand grip and a plurality of indents on said body and being aligned to receive said detent in one of a said at least two positions when said hand grip is pivotally moved about said pivotal connection.

15. The game controller according to claim 12, wherein said positioning system comprises a resilient friction fit between said hand grip and said body, said resilient friction fit being sufficient to allow movement of said at least one hand grip and retain said hand grip in a desired position.

16. The game controller according to claim 12, further comprising an indexing system for indicating the position of said at least one hand grip with respect to said body.

17. The game controller according to claim 16, wherein said indexing system comprises a plurality of hand grip indicator lines on said hand grip and at least one body indicator line on said body, wherein said at least one body indicator line is aligned with at least one of said plurality of hand grip indicator lines when said at least one hand grip is positioned in a desired operable position by the user.

* * * * *